United States Patent
Cooney et al.

(10) Patent No.: US 9,747,387 B2
(45) Date of Patent: Aug. 29, 2017

(54) METHODS AND SYSTEMS FOR CONTENT ENHANCEMENT

(75) Inventors: Dominic P. Cooney, Otaku (JP); Mark S. Miller, Belmont, CA (US); Robert A. Russell, London (GB); Dmitri A. Glazkov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 421 days.

(21) Appl. No.: 13/585,693

(22) Filed: Aug. 14, 2012

(65) Prior Publication Data

US 2013/0047075 A1 Feb. 21, 2013

Related U.S. Application Data

(60) Provisional application No. 61/523,832, filed on Aug. 15, 2011.

(51) Int. Cl.
| | | |
|---|---|---|
| *G06F 17/00* | (2006.01) | |
| *G06F 17/30* | (2006.01) | |
| *G06F 17/22* | (2006.01) | |
| *H04L 29/08* | (2006.01) | |

(52) U.S. Cl.
CPC .... *G06F 17/30905* (2013.01); *G06F 17/2247* (2013.01); *H04L 67/02* (2013.01)

(58) Field of Classification Search
CPC .......... G06F 17/30905; G06F 17/2247; G06F 17/24; G06F 11/1438; H04L 67/02; H04L 67/2823
USPC ....... 715/201, 205, 230, 234, 236, 240, 242, 715/243, 249, 251, 255, 273, 745, 760; 709/203, 204, 206, 217, 219
See application file for complete search history.

(56) References Cited

U.S. PATENT DOCUMENTS

| | | | |
|---|---|---|---|
| 6,775,671 B1 * | 8/2004 | de Lara et al. | |
| 6,799,302 B1 * | 9/2004 | Sites | 715/210 |
| 6,950,987 B1 * | 9/2005 | Hargraves et al. | 715/207 |
| 7,200,633 B2 * | 4/2007 | Sekiguchi et al. | 709/203 |
| 7,533,117 B2 * | 5/2009 | de Lara et al. | |
| 7,574,653 B2 * | 8/2009 | Croney et al. | 715/249 |
| 7,664,870 B2 * | 2/2010 | Baek et al. | 709/231 |
| 7,930,624 B2 * | 4/2011 | Phillips et al. | 715/201 |
| 7,966,374 B2 | 6/2011 | Huynh et al. | |
| 8,392,832 B2 * | 3/2013 | Arastafar | G06F 17/211 715/201 |
| 8,407,611 B2 * | 3/2013 | Zhang et al. | 715/762 |
| 8,572,479 B2 * | 10/2013 | Sylthe | 715/243 |
| 8,627,198 B2 * | 1/2014 | Martinsen et al. | 715/234 |
| 8,667,054 B2 * | 3/2014 | Tahan | 709/203 |

(Continued)

OTHER PUBLICATIONS

International Search Report and Written Opinion dated Oct. 19, 2012, issued in related PCT Application No. PCT/US2012/050800.

*Primary Examiner* — Cesar Paula
*Assistant Examiner* — James H Blackwell
(74) *Attorney, Agent, or Firm* — McDermott Will & Emery LLP

(57) ABSTRACT

A method, system and computer program product for progressive enhancement of content in a browser. The method includes receiving a document with content containing a plurality of elements and parsing the received content with at least one processor. The method also includes identifying a subset of the plurality of elements that are marked for enhancement and replacing each of the element in the identified subset with their respective enhancement to obtain the document with the enhanced elements.

28 Claims, 6 Drawing Sheets

(56) References Cited

U.S. PATENT DOCUMENTS

| | | | |
|---|---|---|---|
| 2002/0010725 A1* | 1/2002 | Mo | G06F 17/214 715/205 |
| 2002/0103822 A1* | 8/2002 | Miller | G06F 17/30896 715/201 |
| 2003/0018668 A1 | 1/2003 | Britton et al. | |
| 2004/0034831 A1 | 2/2004 | Grober et al. | |
| 2004/0073873 A1* | 4/2004 | Croney et al. | 715/526 |
| 2004/0172389 A1 | 9/2004 | Galai et al. | |
| 2005/0044484 A1* | 2/2005 | Makela | 715/501.1 |
| 2006/0023969 A1* | 2/2006 | Lara et al. | 382/309 |
| 2006/0075336 A1* | 4/2006 | Gawor | G06F 17/30905 715/273 |
| 2006/0101160 A1* | 5/2006 | Coulombe | 709/246 |
| 2006/0143282 A1* | 6/2006 | Brown et al. | 709/217 |
| 2007/0061488 A1* | 3/2007 | Alagappan et al. | 709/246 |
| 2007/0100945 A1* | 5/2007 | Bohle | G06Q 10/10 709/206 |
| 2008/0040424 A1* | 2/2008 | Hines | G06F 17/3089 709/203 |
| 2009/0276696 A1* | 11/2009 | Kapoor et al. | 715/252 |
| 2009/0300709 A1* | 12/2009 | Chen | H04L 67/10 726/1 |
| 2010/0107091 A1* | 4/2010 | Amsterdam | G06F 17/3089 715/760 |
| 2011/0197126 A1* | 8/2011 | Arastafar | G06F 17/30905 715/243 |
| 2012/0210217 A1* | 8/2012 | Abbas et al. | 715/716 |
| 2013/0127916 A1* | 5/2013 | Van Slembrouk et al. | 345/660 |

* cited by examiner

METHODS AND SYSTEMS FOR CONTENT ENHANCEMENT

CROSS-REFERENCE TO RELATED APPLICATION

This patent application claims the benefit of U.S. Provisional Patent Application No. 61/523,832, filed Aug. 15, 2011, entitled "Methods and Systems for Content Enhancement," which is incorporated herein by reference in its entirety.

FIELD

Embodiments of the present application generally relate to content delivery and progressive enhancement.

BACKGROUND

There is a tradeoff between latency and complexity when delivering and presenting applications or documents over a network. Less complex content (for example, low fidelity version of content) can take less time to deliver over a network, parse and present to a user. More complex content (for example, high fidelity version of content) can take more time to deliver over a network, parse and present to a user. Progressive enhancement is a technique to deliver and present complex content with lower latency, by first delivering a low fidelity variant of the content and progressively enhancing parts of the content with high fidelity variants as they become available. This allows a user to start using the application or read the document relatively quickly, but still enjoy rich interactive elements once the rich interactive elements (high fidelity variants) are progressively delivered.

BRIEF SUMMARY

A method and system for progressive enhancement in a document are provided. An example method includes receiving a document with a content containing a plurality of elements and parsing the received content with at least one processor. The method also includes identifying a subset of the plurality of elements that are marked for enhancement and replacing each of the elements in the identified subset with their respective enhancements to obtain the document with the enhanced elements.

Further features and advantages, as well as the structure and operation of various embodiments are described in detail below with reference to the accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
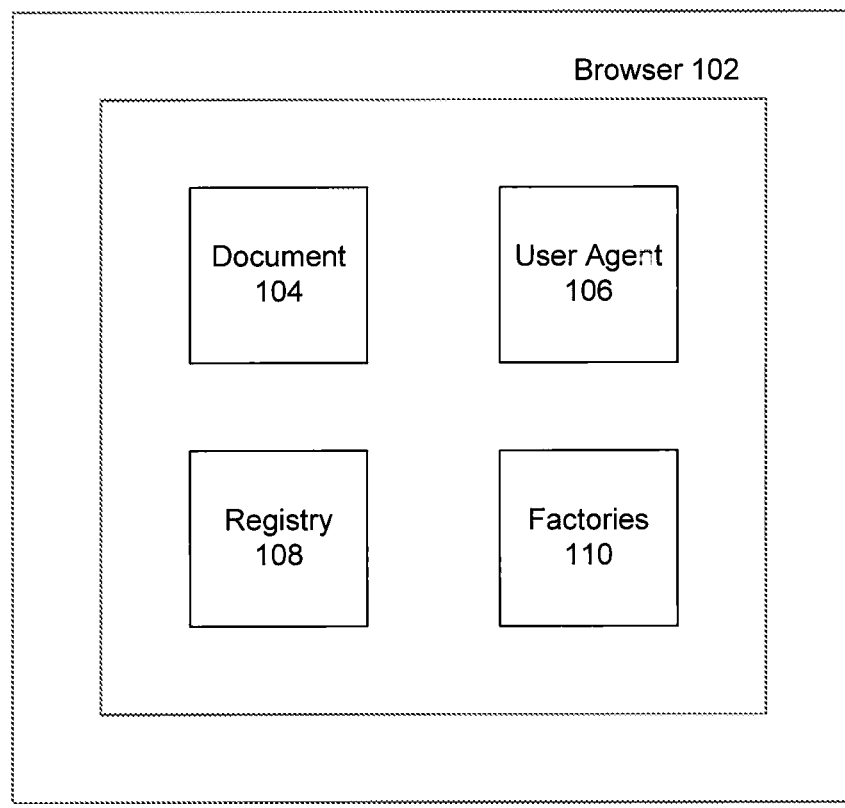
FIG. 1 is a block diagram in which embodiments of the invention can be implemented.

The following detailed description refers to the accompanying drawings that illustrate example embodiments consistent with this invention. Other embodiments are possible, and modifications may be made to the embodiments within the spirit and scope of the invention. Therefore, the detailed description is not meant to limit the invention.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one skilled in the art to effect such feature, structure, or characteristic in connection with other embodiments, whether or not explicitly described.

It would be apparent to one of skill in the art that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments is described with the understanding that modifications and variations of the embodiments are possible, given the level of detail presented herein.

Progressive enhancement is used in web applications today, and achieved by content authors sending basic content followed by a JavaScript. The JavaScript selects parts of the basic content to be enhanced, and replaces it with enhanced content. However, there are various problems associated with implementing progressive enhancement in this way.

First, selecting content to enhance requires searching a document for parts (or elements) that match criteria defined by a script, which can be inefficient.

Second, content created by an author script or dynamically loaded is faced with a problem of choosing whether to create a low fidelity variant or a high fidelity variant of a given element (for example, a static image of a map or an interactive map that supports panning and zooming). The determination as to whether the script should create the high fidelity variant depends on whether the high fidelity variant is available at the time the content is loaded or created. If the script creates the low fidelity variant, but the high fidelity variant of the content (for example, maps with all the available features) has already been downloaded, then the application will present the low fidelity variant and has "missed" the high fidelity variant. Alternatively, if the script creates the high fidelity variant before it is available, an error results and nothing is presented. Furthermore, content created by an author script or dynamically loaded content must specify how to create a high fidelity variant. This is a problem for content that is authored separately from its enhancements, or if the desired enhancement changes after the original content was authored.

Third, as the logic to select content to enhance exists in an imperative author script, it is not possible for independently authored content present in the same document or application to predict what content will be progressively enhanced, or in what order. This approach can lead to errors when one part of a document or application relies on content that has been replaced.

A method and system for progressive enhancement in a document are provided. While embodiments are described in terms of progressive enhancement, embodiments are not limited to progressive enhancement and can be used with any form of content manipulation, delivery and enhancement techniques.

FIG. 1 is a block diagram of a browser environment 100 for progressive enhancement. Browser environment 100 includes a browser 102, one or more documents 104 and user agents 106, registry 108 and factories 110.

Browser 102 can be any browser that can read encoded documents in a form suitable for display. For example, such a browser 102 may include, but not limited to, a CHROME, INTERNET EXPLORER or SAFARI browser. Browser 102 can support technologies including, but not limited to, World Wide Web (or simply the "Web") that provides access to services and applications using protocols such as Hyper Text Transfer Protocol ("HTTP").

HyperText Markup Language ("HTML") is a markup language for displaying web pages and other information in a web browser. In an example, HTML can be written using HTML elements with tags enclosed in angle brackets (for example, <html>), within a web page content. HTML tags commonly come in pairs, for example, <h1> and </h1>, although some tags, known as empty elements, are unpaired, for example <img>. A first tag in a pair can be a start tag and the second tag in the pair can be an end tag (for example, the tags can also be an opening tag and a closing tag). In between the start and end tags, content developers can add text, tags, comments and other types of content. Browser 102 can be used to read documents (for example, HTML documents) and can compose them into visible or audible web pages. Browser 102 does not display tags, but uses tags to interpret content of a web page.

HTML elements form building blocks of websites, HTML can allow images and objects to be embedded and can be used to create interactive forms. HTML can provide a means to create a structured document by denoting structural semantics for text such as headings, paragraphs, lists, links, quotes and other items. HTML can also embed scripts in languages such as JavaScript which may affect the behavior of HTML webpages. Browser 102 can also refer to Cascading Style Sheets (CSS) to define appearance and layout of text and other material.

Documents 104 can be used to deliver content to browser 102. Documents 104 can be any type of document including, but not limited to, an HTML document with HTML elements or other type of document for providing content on the Web. In a further example one or more documents may include code and act as a web application.

In one embodiment, user agent 106 interprets content and elements of a document 104 to efficiently keep track of elements that need enhancement. In an embodiment, user agent 106 can reside in browser 102 and can parse document 104 to identify elements for enhancement.

Enhancement of an element can be replacing a low fidelity version of an element with a respective high fidelity version of the element. For example, a low fidelity version of an element may be a static image of a map with no interactive features, and a high fidelity version of the element can be an interactive map that supports 3D view, street view, panning and zooming etc. User agent 106 can automatically enhance tracked content when high fidelity variants of the tracked content are available. In an embodiment, user agent 106 maintains a table of available high fidelity variants which can be used to enhance low fidelity variants. User agent 106, however, may not be able to create high fidelity variants but may rely on other entities in browser 102 to create high fidelity variants.

In an embodiment, a format may be defined for specifying and/or identifying elements of a document for enhancement. An element that can be enhanced can be marked by attaching an attribute specified by the defined format. For example, by attaching an attribute such as "is" to a low fidelity variant of an element, a content author can mark the element whose low fidelity variant need to be replaced by a high fidelity variant.

For example:

<img is="x-map" src="northamerica.jpg"/>

In the above example, "northamerica.jpg" is a low fidelity variant of a map image. It may be a basic map with no or few interactive features. Image identified by "x-map" may be a high fidelity variant of "northamerica.jpg" which may have additional features, such as 3D view, street view etc. An attribute such as "is" used in the above example is an exemplary attribute and used herein for illustration purposes only and not as a limitation. In other words, embodiments are not limited to is attribute. Embodiments may use any other attribute, data or identifier. For example, an attribute "becomes" can be used.

Browser 102 can recognize that "northamerica.jpg" image can be enhanced with a high fidelity variant identified by "x-map" based on "is" attribute described above. In an embodiment, elements associated with "is" attribute can be added to a document either as a result of a user agent parsing declarative syntax of a form when a document is loaded, or as a result of author script programmatically inserting content into the document.

The description above illustrates a declarative syntax of a form defined by an embodiment. Embodiments can also enable specification of "is" attribute in an author script using document object model (DOM) application programming interface (API) to add the attribute to an element. The format (or form) described above does not interfere with interpretation of low fidelity variants in user agents that do not support progressive enhancement in this way. The absence of such interference provides flexibility to developers creating content.

Registry 108 contains a list of enhancements and maps names of enhancements (for example, "x-map") to definitions. Definitions are referred to herein as factories 110, described, in detail below. Factory 110 is a function that, when invoked, produces a replacement for a given element. When an entry or enhancement is added to registry 108, user agent 106 consults a list of elements that need the registered enhancement, described in detail in FIG. 4 below, and calls factory 110 to create the replacements. For example:

function MyMap( ) { ... }
Element.register("x-map", MyMap);

Registry 108 can also copy event listeners, attributes (excluding attributes, for example, "is") and child content of a low fidelity element to a replacement high fidelity element. Registry 108 can also remove low fidelity element from the document, and insert high fidelity element (for example, replacement) at that position. The above example is purely illustrative and shows registration of an enhancement, and is not intended to limit the invention. Factories 110 can also be functions and definitions which can also include enhancements specified in a declarative syntax, or a combination of author script and declarative syntax.

In an embodiment, when an element is deleted from document 104, the element is deleted from the list of elements needing enhancement stored in register 108. If the deleted element is subsequently re-inserted into document 102, the deleted element is re-added to the list of elements needing enhancement in keeping with the mechanism described above.

In an embodiment, if user agent 106 consults registry 108 and finds that an enhancement is already available (for example, content is dynamically loaded or created programmatically and inserted into document 102 by author script), the element can be replaced in the same way as described above, with the exception that the element that is replaced may not be truly moved in and out of document 102 but its replacement inserted immediately at the place where the old element would have been inserted. This proposed approach is an improvement over existing progressive enhancement techniques as the proposed approach avoids redundant bookkeeping (for example, notifications) associated with moving an element in and out of the list of elements that need enhancement.

In an embodiment, this mechanism can function recursively, for example, if there are multiple elements that need replacement and one element is contained within another element, when a factory is registered.

If a factory 110 is not registered, or has an invalid registration (for example, an error is generated when called to create replacement elements), or not registered for a given name in use, embodiments do not impact the presentation of document 102.

Embodiments can include a mechanism to notify an author script when replacing an element. In an embodiment, an author script can identify elements that need to be enhanced due to the presence of "is" attribute. The author script can register an event listener for an event called "becoming." When an element is being replaced with its enhancement, user agent 106 calls event listeners that registered for the "becoming" event on the old element (low fidelity variant), passing a reference to the element being replaced and its replacement. In an embodiment, author scripts that hold a reference to an element that can be replaced can use this event to determine when their reference is no longer current and should be discarded in favor of the enhancement.

Embodiments may include a means for an author script to find a replacement for a given element after the fact. When an element is replaced as described above, embodiments attach a script property called "became" to the old element and set its value to direct to the replacement. In an embodiment, an author script can consult this property in lieu of or in addition to registering an event listener to update any reference it holds to the low fidelity element. The timing of when a "becoming" event is delivered to an author script can be varied. For example, not intended to limit the invention, if the "becoming" event is delivered before attributes, event listeners and child content is copied from the low-fidelity element to its replacement, then author script may intervene and control what is copied. An example routine is described further below with respect to method 500 in FIG. 5.

In an embodiment, author script can detect when an element created programmatically has been synchronously replaced because an enhancement was already available when the element was inserted. For example:

```
var b = document.createElement('button');
b.setAttribute('is', 'x-map');
document.body.appendChild(b);
if (b.became) {
// synchronous replacement detected
b = b.became;
}
// more initialization
```

In an embodiment, author script can consult this property to implement optimizations such as skipping operations to establish low fidelity variants that are not required when the respective rich variants are already available. By establishing a reference in one direction from the old element to its replacement, embodiments permit garbage collection of the old element in the typical case where only the replacement is of continued interest to the program.

Embodiments are compatible with user agents that may not implement progressive enhancement as described above. Likewise, embodiments can opt not to copy attributes, event listeners and child content to the replacement, or to only copy certain attributes depending on the kind of replacement, etc.

In an embodiment, providing an author script a facility to find a replacement for a given element can be done, for example, through a function that takes a replaced element as an argument instead of using a property. Furthermore, in an embodiment, the need for such a mapping can be obviated by stopping author script and replacing existing references to the replaced element with the replacement through an algorithm similar to garbage collection. Alternatively, in an embodiment, the replacement mechanism, instead of using a factory to create a new element, can use functions that merely reconfigure the existing element to enhance it.

Another embodiment can provide a mechanism to unregister enhancements, after which new elements are no longer automatically upgraded. Embodiments can also track replacements and swap back their low fidelity variants, for example, in response to a low memory situation.

Embodiments can enhance elements at different times, for example, delaying the enhancement of elements that are not visible on the screen or delaying enhancing elements until a set of enhancements for a given sub-tree or defined in a given author script are all available. In an embodiment, book-keeping of elements that need enhancement may happen at different times. For example, removing elements from the list that have been removed from the document may be done only periodically or not at all.

While embodiments are described in terms of progressive enhancement, embodiments are not limited to progressive enhancement and can be used with any form of content manipulation, delivery and enhancement techniques.

Figure 2:
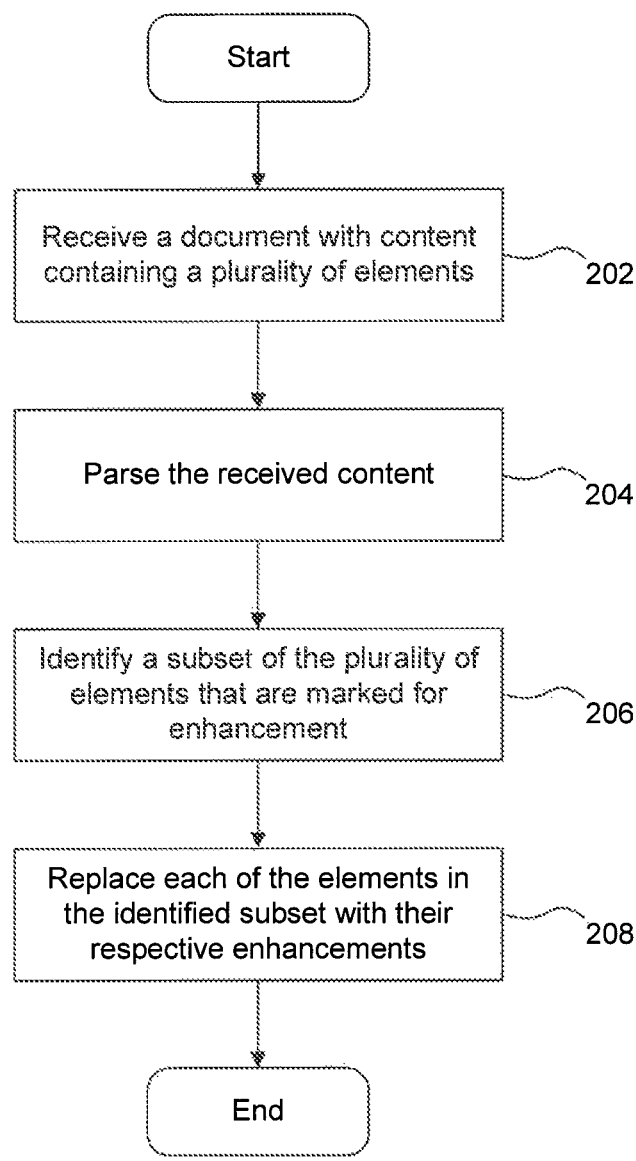
FIG. 2 is a flowchart of a method for progressive enhancement, according to an embodiment.

FIG. 2 is a flowchart of a method 200 for progressive enhancement in a browser environment, according to an embodiment.

At stage 202, document 104 with content containing a plurality of elements is received by browser 102. A person skilled in the relevant art is familiar with the elements of document 104. For example, elements can be HTML elements or custom elements designed for use with an application. The elements in document 104 may be created by a number of actors. For example, the elements in document 104 can be created programmatically by a script, an HTML parser when receiving (or downloading) document 104, or a html parser in response to a script updating textual markup in document 104.

At stage 204, document 104 is parsed. For example, when document 104 is rendered in browser 102, user agent 106 can parse language (for example, HTML) to identify any elements marked for enhancement. An example routine for parsing is described further below with respect to method 300 in FIG. 3.

At stage 206, a subset of elements of document 104 to be enhanced are identified. User agent 106 identifies elements that have to be enhanced based on parsing of document 104, at stage 204 above, by user agent 106. For example, user agent 106 may identify one or more elements of document 104 for enhancement.

In an embodiment, the elements of document 104 that require enhancement can be identified based on the presence of an attribute or identifier (for example, "is") marked by attaching the attribute specified by the format above. For example, by attaching an attribute such as "is" to a low fidelity variant of an element, a content author can mark the element whose low fidelity variant need to be replaced by a high fidelity variant.

At stage 208, user agent 106 replaces each of the elements in the identified subset with their respective enhancements. User agent 106 replaces low fidelity versions of an element identified for replacement with a respective high fidelity version of the elements to obtain an enhanced document. For example, user agent 106 may replace "northamerica.jpg" which is a low fidelity version of a map image with "x-map" which is a high fidelity version of the map. The replacement step continues until all elements marked for replacement are replaced with their respective enhancements. An example routine for replacing an element with an enhancement is described further below with respect to method 500 in FIG. 5.

As described earlier, for each element to be enhanced, user agent 106 contacts registry 108 for identifying names of the replacements. Registry 108 contains a list of enhancements and maps names of enhancements (for example, "x-map") to definitions. Definitions are referred to herein as factories 110, described in detail above. Factory 110 is a function that, when invoked, produces a replacement for a given element. When an entry or enhancement is added to registry 108, user agent 106 consults a list of elements that need the registered enhancement, described in detail in FIG. 4 below, and calls factory 110 to create the replacements.

Figure 3:
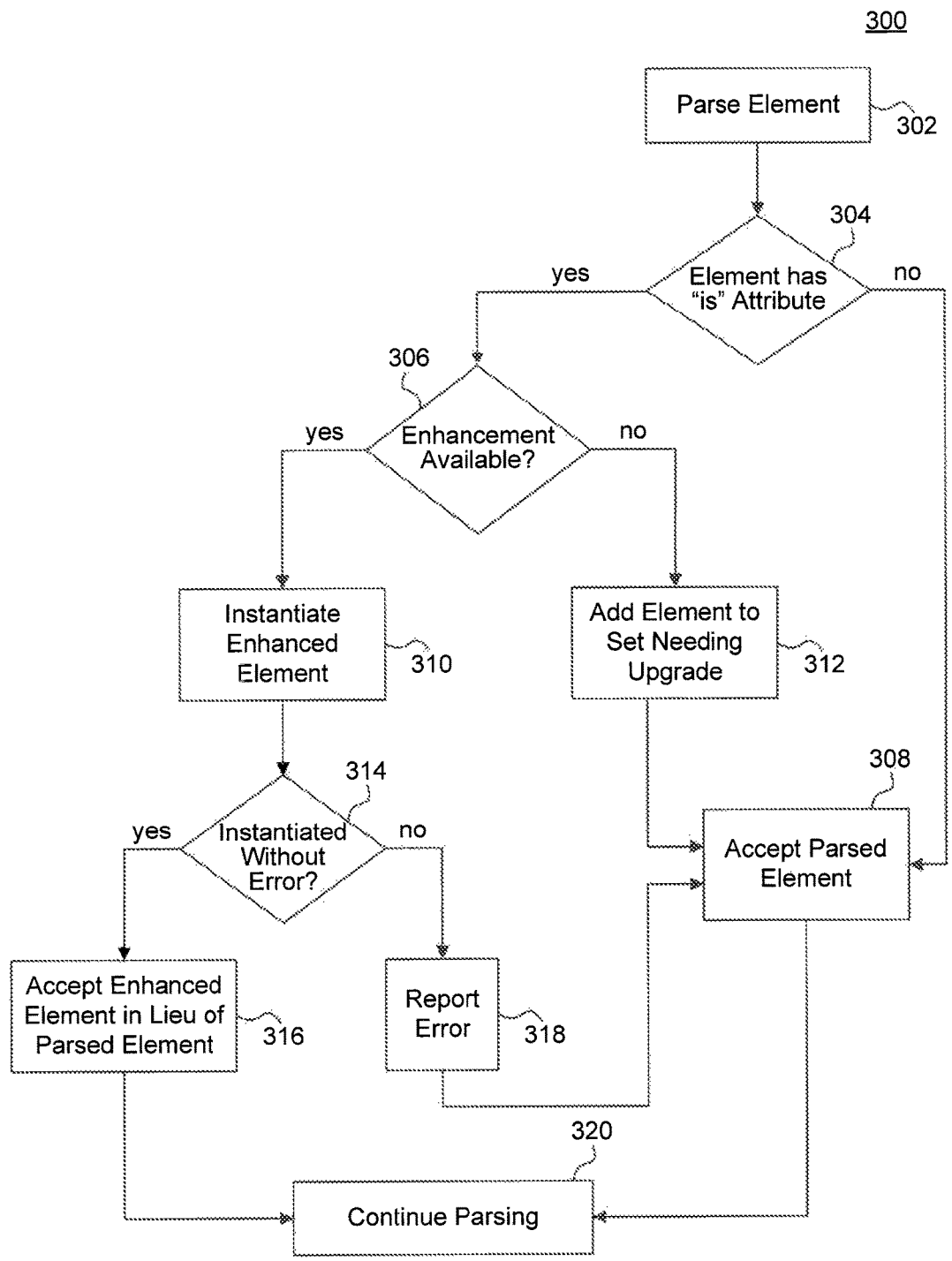
FIG. 3 is a flowchart of a method for parsing a document, according to an embodiment.

FIG. 3 is a flowchart of a method 300 for parsing a document 104 for progressive enhancement, according to an embodiment.

At stage 302, contents of document 104 containing a plurality of elements, received by browser 102, are parsed by user agent 106. As described above, user agent 106 can parse declarative syntax of document 104 as document 104 is loaded.

At stage 304, a determination is made as to whether document 104 includes an attribute that identifies an element for progressive enhancement. For example, elements for progressive content enhancement can be identified by an exemplary attribute, such as "is", as explained in detail above. When such an identifier is detected along with the name of the replacement, control in user agent 106 proceeds to stage 306, otherwise proceeds to stage 308 where the parsed element which has been identified to lack any enhancements by user agent 106 is accepted for display in browser 102.

At stage 306, a determination is made as to whether an enhancement (or replacement) defined by an attribute such as "is" is available. User agent 106 performs this check to verify if the enhancement identified at stage 304 is available before user agent 106 tries to instantiate it to minimize error scenarios in browser 102. For example, an error scenario can be user agent 106 instantiating an enhanced element which is not available at that time. When the identified enhancement is available, control in user agent 106 proceeds to stage 310, otherwise proceeds to stage 312.

At stage 310, an enhancement for an element determined to be available at stage 306 is instantiated. For example, enhanced element "x-map" described above may be instantiated. A person skilled in the relevant art is familiar with the concept of instantiation in programming languages. At stage 312, an enhancement for an element determined to be "not available" is set to "needing upgrade" by user agent 106, and accepted for display in browser 102. For example, when enhanced element "x-map" is not yet available, the element is set to "needing upgrade" and the low fidelity version "northamerica.jpg" is accepted for display in browser 104. This mechanism allows for handling scenarios when an enhancement for an element identifying for enhancement is not available.

At stage 314, a determination is made as to whether an enhanced element is instantiated without any errors by user agent 106. This check is performed by user agent 106 to minimize error scenarios where instantiation of an enhanced element (or identified enhancement) may fail due to various reasons. For example, user agent 106 may check if enhanced element "x-map" is instantiated without any errors. This check may help in avoiding failure scenarios. When enhanced element is instantiated without any errors, control in user agent 106 proceeds to stage 316, otherwise proceeds to stage 318.

At stage 316, the instantiated enhanced element is accepted by user agent 106 in lieu of the parsed element. For example, enhanced element "x-map" is accepted by user agent 106 as a replacement for "northamerica.jpg," and user agent 106 continues with parsing of elements.

At stage 318, an error is reported by user agent 106 when an enhanced elements instantiates with errors. These errors may be due to various reasons, and may prevent user agent 106 from using the enhanced element. An error is reported to user agent 106, and the parsed element (low fidelity version) is accepted by user agent 106 for display in browser 102.

Figure 4:
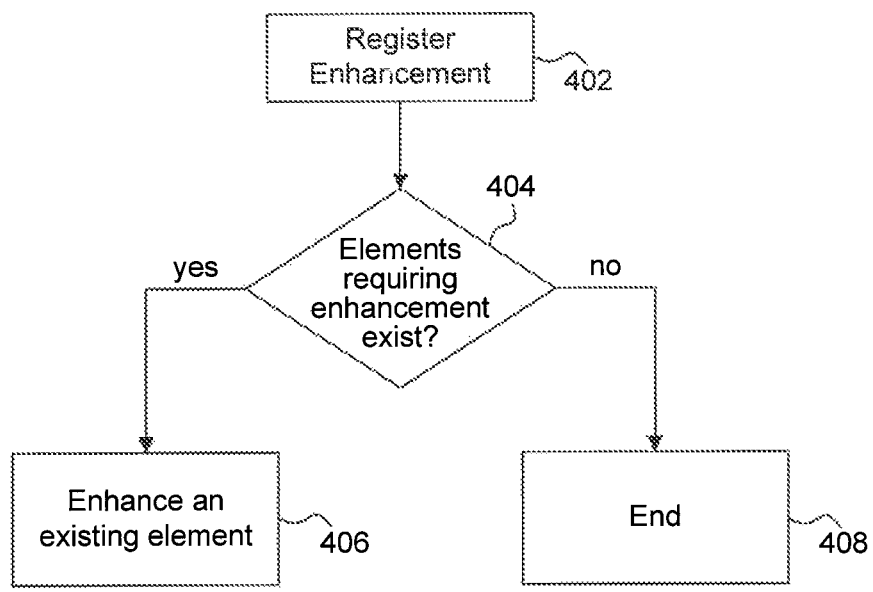
FIG. 4 is a flowchart of a method for determining whether enhancement of an element is required, according to an embodiment.

FIG. 4 is a flowchart of a method 400 for determining whether enhancement of an existing element is required, according to an embodiment. In one embodiment not intended to be limiting, user agent 106 can be used to perform steps 402-408.

At stage 402, an enhancement is registered by user agent 106. This registration can be performed when an enhancement is added to registry 108.

At stage 404, a determination is made as to whether elements requiring enhancement for the registered element exist. For example, the determination can be made by user agent 106 to check and determine elements to be replaced by the registered enhancement. For example, this check can be performed when an enhancement is added to registry 108 by user agent 106 by consulting a list of elements that need the registered enhancement. This mechanism allows immediate replacement of an element once an enhancement becomes available which can improve a user's experience when browsing content in browser 102. When elements requiring enhancement exist, control of user agent 106 proceeds to stage 406, otherwise the control proceeds to stage 308 where it ends.

At stage 406, an element identified for enhancement is enhanced. For example, user agent 106 can replace an earlier lower-fidelity version of an element and replace it with an enhanced element. An example replacement method can include but it not limited to that shown in FIG. 5.

Figure 5:
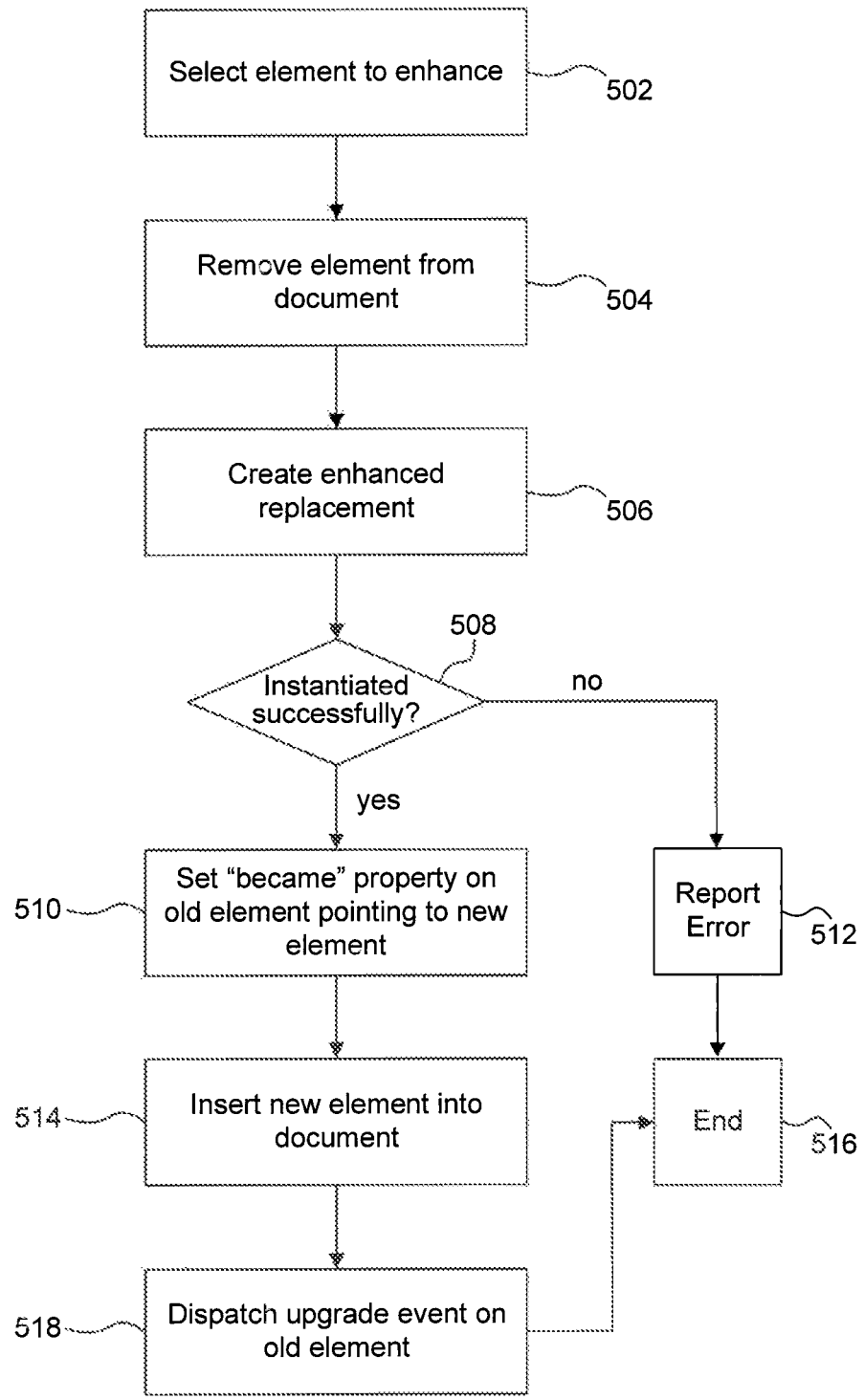
FIG. 5 is a flowchart of a method for replacing an element in a document, according to an embodiment.

FIG. 5 is a flowchart of a method 500 for replacing an element with an enhancement, according to an embodiment.

At stage 502, an element identified for enhancement in document 104 is selected by user agent 106. For example, user agent 106 can select "northamerica.jpg" for enhancement as described above. The selection of an element for enhancement by user agent 106 can be based on the presence of an attribute or identifier as described in FIG. 3.

At stage 504, an element selected for enhancement by user agent 106 is removed from document 104. For example, element northamerica.jpg" may be replaced by user agent 106 as it may be associated with a low fidelity version of the element.

At stage 506, an enhancement of the element that is removed in step 504 is created by user agent 106. For example, enhanced element "x-map" can be created by user agent 106 to insert in place of the element removed from document 104 in step 504. This may be carried out by user agent 106 by a call to factory 106 in a number of ways as described in detail above with respect to FIG. 1. For example, registry 108 can map name of an enhancement to a definition, and perform a call to a factory to create the replacement.

At stage 508, a determination is made by user agent 106 as to whether an enhanced replacement is instantiated successfully. User agent 106 performs this check to verify if the enhancement is created successfully at stage 506 to minimize error scenarios in browser 102. When the enhanced replacement is instantiated successfully, control in user agent 106 proceeds to stage 510, otherwise control proceeds to stage 512.

At stage 510, version of the element is set to "became", and pointing to the new enhanced element. When an element is replaced as described above, embodiments attach a script property called "became" to the old element and set its value to direct to the replacement. In an embodiment, an author script can consult this property in lieu of or in addition to registering an event listener to update any reference it holds to the low fidelity element.

At stage 512, an error condition is reported by user agent 106. For example, instantiation of replacement may fail due to "lack of memory." Control in user agent 106 then proceeds to step 516 (end).

At stage 514, replacement element or enhanced element is inserted into document 104 by user agent 106 to obtain a document with enhanced elements.

At stage 518, an upgrade event message or report on an "older" (or low fidelity version of the element) is dispatched by user agent 106. This message for example may be sent to user agent 106. The dispatch of upgrade event, for example, to an author script helps minimize error scenarios.

Figure 6:
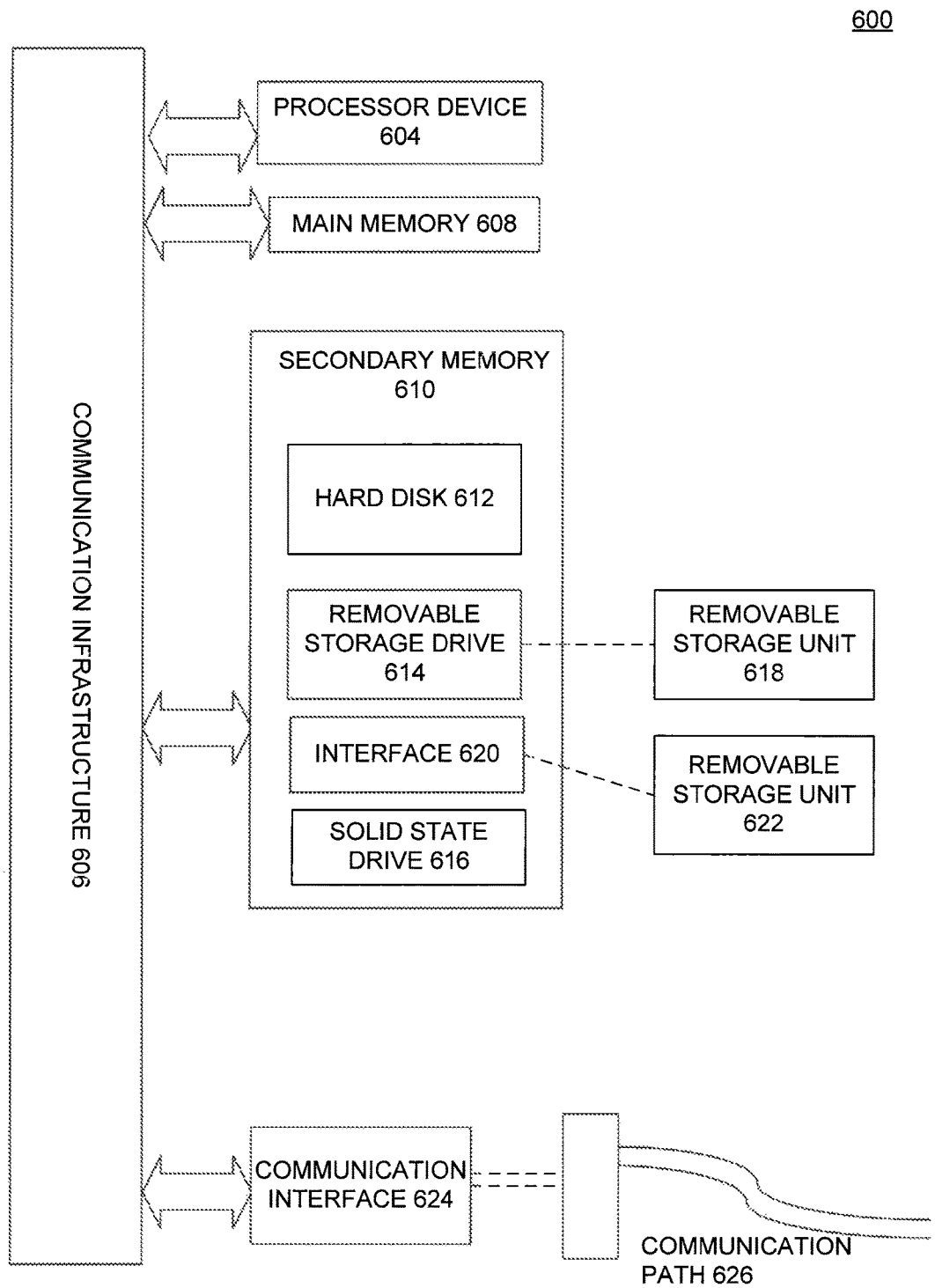
FIG. 6 is a diagram of an example computer system that may be used in an embodiment.

FIG. 6 is a diagram of an example computer system 600 that may be used in an embodiment.

FIG. 6 illustrates an example computer system 600 in which embodiments of the present invention, or portions thereof, may be implemented. For example, portions of systems or methods illustrated in FIGS. 1-5 may be implemented in computer system 600 using hardware, software, firmware, tangible computer readable media having instructions stored thereon, or a combination thereof and may be implemented in one or more computer systems or other processing systems.

If programmable logic is used, such logic may execute on a commercially available processing platform or a special purpose device. One of ordinary skill in the art may appreciate that embodiments of the disclosed subject matter can be practiced with various computer system and computer-implemented device configurations, including multi-core multiprocessor systems, mainframe computers, computer linked or clustered with distributed functions.

For instance, at least one processor device and a memory may be used to implement the above described embodiments. A processor device may be a single processor, a plurality of processors, or combinations thereof. Processor devices may have one or more processor cores.

Various embodiments of the invention are described in terms of this example computer system 600. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 604 may be a single processor in a multi-core/multiprocessor system, such system operating alone, or in a cluster of computing devices operating in a cluster or server farm. Processor device 604 is connected to a communication infrastructure 606, for example, a bus, message queue, network or multi-core message-passing scheme.

Computer system 600 also includes a main memory 608, for example, random access memory (RAM), and may also include a secondary memory 610. Secondary memory 610 may include, for example, a hard disk drive 612, removable storage drive 614 and solid state drive 616. Removable storage drive 614 may include a floppy disk drive, a magnetic tape drive, an optical disk drive, a flash memory, or the like. The removable storage drive 614 reads from and/or writes to a removable storage unit 618 in a well known manner. Removable storage unit 618 may include a floppy disk, magnetic tape, optical disk, flash drive etc. which is read by and written to by removable storage drive 614. As will be appreciated by persons skilled in the relevant art, removable storage unit 618 includes a computer readable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such devices may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 may be in electronic, electromagnetic, optical, or other forms capable of being received by communications interface 624. This data may be provided to communications interface 624 via a communications path 626. Communications path 626 carries the data and may be implemented using wire or cable, fiber optics, a phone line, a cellular phone link, an RF link or other communications channels.

In this document, the terms "computer program storage medium" and "computer readable storage medium" are used to generally refer to storage media such as removable storage unit 618, removable storage unit 622, and a hard disk installed in hard disk drive 612. Computer program storage medium and computer readable storage medium may also refer to memories, such as main memory 608 and secondary memory 610, which may be memory semiconductors (for example, DRAMs, etc.).

Computer programs (also called computer control logic) may be stored in main memory 608 and/or secondary memory 610. Computer programs may also be received via communications interface 624 in non-storage capable signals. Such computer programs, when executed, enable computer system 600 to implement embodiments as discussed herein. In particular, the computer programs, when executed, enable processor device 604 to implement the processes of embodiments, such as the stages in the method illustrated by method 600 of FIG. 6 discussed above. Accordingly, such computer programs represent controllers of the computer system 600. Where embodiments are implemented using software, the software may be stored in a computer program product and loaded into computer system 600 using removable storage drive 614, interface 620, hard disk drive 612 or communications interface 624.

Embodiments of the invention also may be directed to computer program products comprising software stored on any computer readable storage medium. Such software, when executed in one or more data processing devices, causes a data processing device(s) to operate as described herein. Embodiments of the invention employ any computer useable or readable storage medium. Examples of computer readable storage mediums include, but are not limited to, primary storage devices (for example, any type of random access memory), and secondary storage devices (for example, hard drives, floppy disks, CD ROMS, ZIP disks, tapes, magnetic storage devices, and optical storage devices, MEMS, nanotechnological storage device, etc.).

Embodiments described herein relate to methods and apparatuses for managing pooled resources of VPN proxy servers. The summary and abstract sections may set forth one or more but not all example embodiments as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the disclosure that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described example embodiments, but should be defined only in accordance with the claims and their equivalents.

What is claimed is:

1. A computer-implemented method comprising:
  receiving, from a server over a network, a document with content containing a plurality of elements;
  parsing the received content with at least one processor;
  identifying a subset of the plurality of elements that are marked for enhancement;
  determining, for each element in the identified subset, whether a respective enhancement is locally available for the element, wherein each element comprises a first attribute that identifies an initial content for the element and a second attribute that comprises a name of the respective enhancement for the element, the name being mapped in a locally stored registry to a function that produces the respective enhancement for the element;
  identifying, for each element in the identified subset for which the respective enhancement is locally available, the function that is mapped in the locally stored registry to the name comprised in the second attribute of the element;
  instantiating, for each element in the identified subset for which the respective enhancement is locally available, the respective enhancement for replacing at least a portion of the element using at least the identified function;
  determining that the respective enhancement for a first set of the elements in the identified subset are successfully instantiated;
  replacing, for each element in the first set, at least a portion of the element with its respective enhancement at a position in the document associated with the element;
  providing the document for display including the respective enhancement for each of the first set of the elements as well as each element in the identified subset for which the respective enhancement was not locally available; and
  replacing, while the document is being displayed, at least a portion of each element in the identified subset for which the respective enhancement was not locally available prior to providing the document for display with the respective enhancement when the respective enhancement becomes locally available.

2. The computer-implemented method of claim 1, wherein the receiving receives the content from an author of the document.

3. The computer-implemented method of claim 1, wherein the identifying comprises identifying a presence of at least the first or second attribute.

4. The computer-implemented method of claim 1, wherein the initial content comprises a low fidelity version of the element and the respective enhancement comprises a corresponding high fidelity version of the element.

5. The computer-implemented method of claim 4, further comprising: detecting the high fidelity version of the element when an author script inserts the high fidelity version of the element into the document.

6. The computer-implemented method of claim 5, further comprising: registering, by the author script, for notifications when at least a portion of the low fidelity version of the element is replaced with the high fidelity version of the element.

7. The computer-implemented method of claim 4, further comprising: detecting the high fidelity version of the element when a user agent parses the document during loading of the document in a web browser.

8. The computer-implemented method of claim 4, the replacing further comprising: contacting the locally stored registry for a list of available high fidelity versions of the element.

9. The computer-implemented method of claim 8, further comprising: mapping, in the locally stored registry, respective names of the high fidelity versions of the element to respective functions that produce the respective high fidelity versions.

10. The computer-implemented method of claim 4, further comprising: invoking the function to produce the high fidelity version of the element to replace at least a portion of the low fidelity version of the element.

11. The computer-implemented method of claim 1, further comprising: determining that the respective enhancement for a second set of the elements in the identified subset is unsuccessfully instantiated; and maintaining each element of the second set of the elements in the document.

12. The method of claim 1, further comprising: replacing, while the document is being displayed, at least a portion of the respective enhancement for at least one element in the first set with the initial content for the at least one element in the first set.

13. A non-transitory computer-readable storage device having computer program logic recorded thereon, execution of which, by a computing device, causes the computing device to perform operations comprising:
receiving a document, from a server over a network, with content containing a plurality of elements;
parsing the received content with at least one processor;
identifying a subset of the plurality of elements that are marked for enhancement; determining, for each element in the identified subset, whether a respective enhancement is available for the element, wherein each element comprises a first attribute that identifies an initial content for the element and a second attribute that comprises an identifier of the respective enhancement for the element, the identifier being mapped in a locally stored registry to a function that produces the respective enhancement for the element;
identifying, for each element in the identified subset for which the respective enhancement is locally available, the function that is mapped in the locally stored registry to the identifier comprised in the second attribute of the element;
instantiating, for each element in the identified subset for which the respective enhancement is available, the respective enhancement for replacing at least a portion of the element using at least the identified function;
determining that the respective enhancement for a first set of elements in the identified subset are successfully instantiated;
replacing, for each element in the first set of elements, at least a portion of the element with its respective enhancement at a position in the document associated with the element;
providing the document for display; and
replacing, in the displayed document, at least a portion of at least one element in the identified subset for which the respective enhancement was not available prior to providing the document for display with the respective enhancement when the respective enhancement becomes locally available.

14. The non-transitory computer-readable storage device of claim 13, wherein the content is received from an author of the document.

15. The non-transitory computer-readable storage device of claim 13, wherein the identifying comprises identifying a presence of at least one of the first or second attributes to identify elements to be at least partially replaced.

16. The non-transitory computer-readable storage device of claim 13, wherein the replacing comprises replacing at least a portion of a low fidelity version of an element with a corresponding high fidelity version of the element.

17. The non-transitory computer-readable storage device of claim 16, further comprising: detecting the high fidelity version of the element when an author script inserts the high fidelity version of the element into the document.

18. The non-transitory computer-readable storage device of claim 17, wherein the author script registers for notifications when the at least the portion of the low fidelity version of the element is replaced with the high fidelity version of the element.

19. The non-transitory computer-readable storage device of claim 16, further comprising: detecting the high fidelity version of the element when a user agent parses the document during loading of the document in a web browser.

20. The non-transitory computer-readable storage device of claim 16, the replacing further comprising: retrieving, from the locally stored registry, a list of available high fidelity versions of the element.

21. The non-transitory computer-readable storage device of claim 20, wherein the locally stored registry maps a name of the high fidelity version of the element to a factory, wherein the factory comprises a function that, when invoked, produces the high fidelity version of the element for replacing the at least the portion of the low fidelity version of the element.

22. A system, comprising:
one or more processors;
at least one memory comprising instructions stored therein, which when executed by the one or more processors, cause the one or more processors to:
receive, from a server over a network, a document with content comprising elements;
identify a subset of the elements that are marked for enhancement, wherein a first element of the subset of the elements comprises a first attribute that includes a first identifier of a first enhancement for the first element;
determine that the first enhancement is locally available for the first element of the subset of the elements and that a second enhancement is not locally available for a second element of the subset of the elements based at least in part on determining that the first identifier of the first enhancement is mapped in a locally stored data structure to a first function for producing the first enhancement;

replace at least a portion of the first element with the first enhancement at a position in the document associated with the first element using at least the first function mapped in the locally stored data structure to the first identifier of the first enhancement;

provide the document for display on the system including the first enhancement and the second element; and replace, while the document is being displayed, at least a portion of the second element with the second enhancement when the second enhancement becomes locally available.

23. The system of claim 22, wherein the content is received from an author of the document.

24. The system of claim 22, wherein the instructions, when executed by the one or more processors, further cause the one or more processors to use attributes of the elements to identify the subset of the elements that are marked for enhancement, the attributes comprising the first attribute of the first element.

25. The system of claim 22, wherein the document is provided for display with a low fidelity version of the second element, the second enhancement comprises a high fidelity version of the second element, and the second element comprises attributes that identify both the low fidelity and high fidelity versions.

26. The system of claim 22, wherein the instructions, when executed by the one or more processors, further cause the one or more processors to: instantiate the first enhancement before replacing the at least the portion of the first element with the first enhancement; and determine that the first enhancement has been successfully instantiated before replacing the at least the portion of the first element with the first enhancement.

27. The system of claim 22, wherein the second enhancement becomes locally available after the second enhancement is downloaded from the server over the network.

28. The system of claim 22, wherein the second element comprises an attribute that includes a second identifier of the second enhancement, and the instructions, when executed by the one or more processors, further cause the one or more processors to: determine that the second enhancement is not locally available for the second element of the subset of the elements based at least in part on determining that the second identifier of the first enhancement is not mapped in the locally stored data structure to any function for producing the second enhancement.

* * * * *